Feb. 14, 1967  L. W. BOOTH  3,303,562
TREE PRUNING TOOL
Filed Feb. 10, 1965
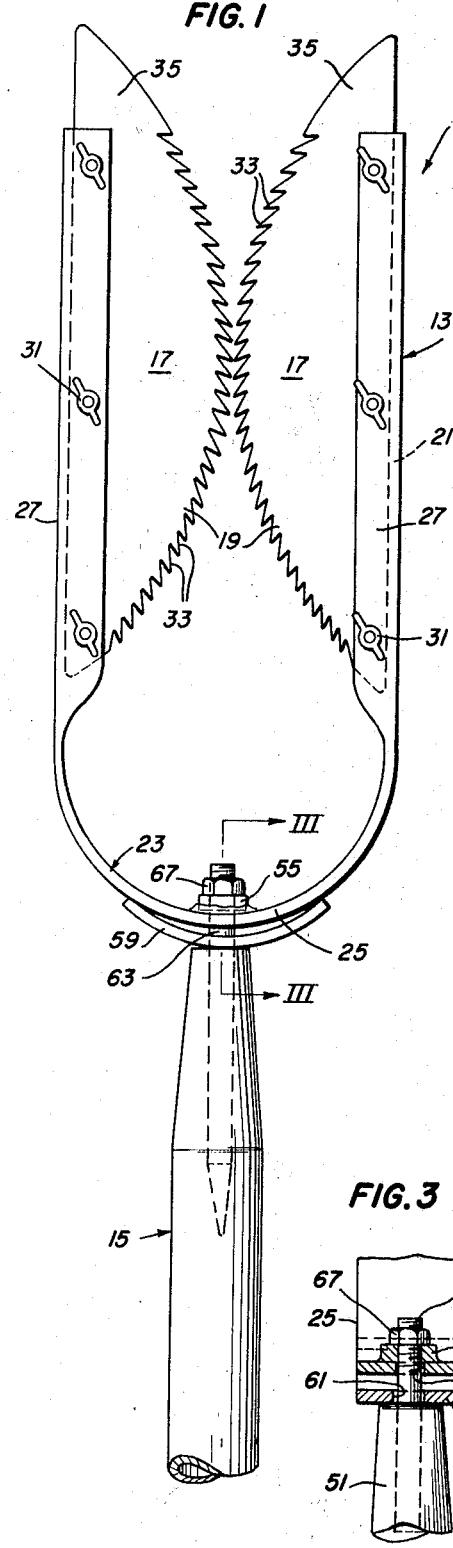
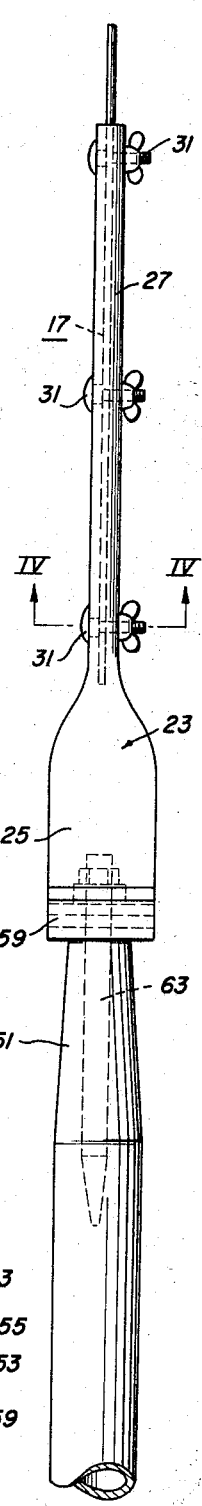
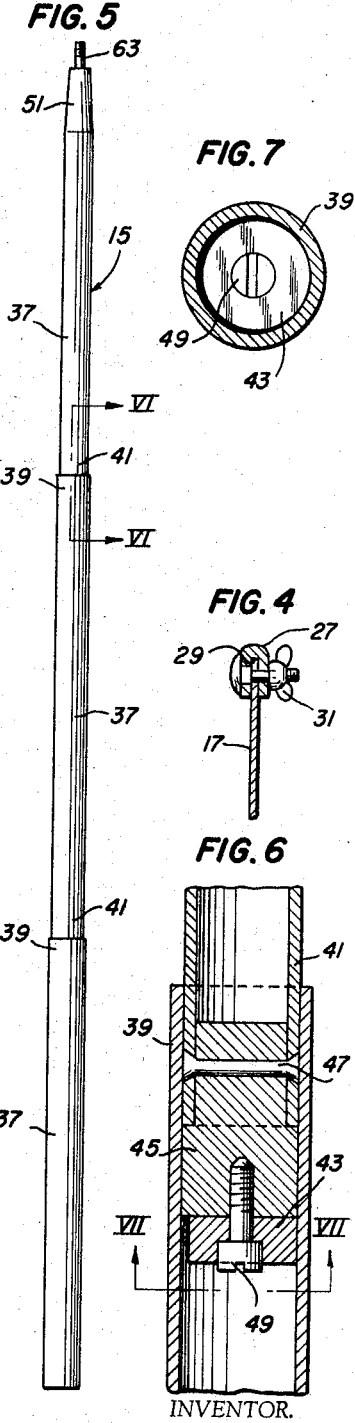
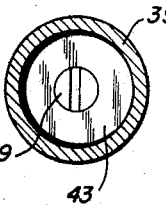
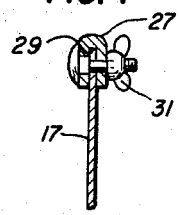
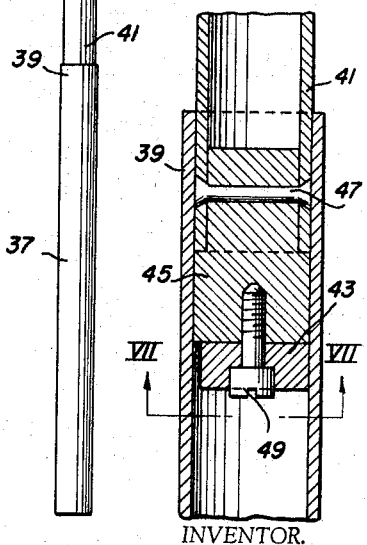
INVENTOR.
LENDON W. BOOTH
BY John R. Walker, III
Attorney

United States Patent Office 3,303,562
Patented Feb. 14, 1967

3,303,562
TREE PRUNING TOOL
Lendon W. Booth, 943 Semmes, Memphis, Tenn. 38111
Filed Feb. 10, 1965, Ser. No. 431,568
1 Claim. (Cl. 30—166)

This invention relates generally to pruning equipment and relates specifically to a hand-operable tool for use in sawing tree limbs disposed some distance from the ground and some distance from the operator of the tool.

The most often used tool for sawing limbs disposed some distance from the ground is the so-called pole saw, which basically includes a substantially long pole with a saw attached to the upper end or head thereof. In using a pole saw, the operator moves the saw with the pole back and forth across the limb to sever the limb from the tree. Certain undesirable features of the typical pole saw are apparent, and one such feature in particular is a considerable problem. When a limb is cut, there often occurs the problem of splitting that portion of the limb left on the tree or stripping the wood and the bark as the limb is severed from the tree. Such splitting or stripping of the limb or wood causes an unsightly job and, in general, is not good practice in pruning or caring for trees. To prevent splitting a limb, the operator of a pole saw will often "match-saw" the limb, that is, he will invert the saw and make a cut from the underside of the limb and then cut the limb through from the top side. The procedure of match-sawing a limb, as above described, is relatively effective to prevent the limb or wood from splitting, but this requires considerable time to be carried out. The saw often must be repositioned at a different angle on the upper end of the pole handle in order to accomplish such a match-sawing job.

The present invention seeks to overcome such objectionable features as above-mentioned and has as one of its principal objects to provide a pruning saw which includes a pair of arced-edge saw blades which cut from both sides of a limb at once and thus match-saws the limb to prevent it from splitting or stripping the bark.

A further object is to provide a tool having resilient blade connecting and supporting means for spring-urging the blades together and automatically providing feed of the blades as the limb is cut.

A further object is to provide a tool which cuts off the limb in such a manner that the tool may be used to guide or lower the limb to the ground.

A further object is to provide a saw which cuts the limb without pinching or binding the saw blades.

A further object is to provide a tool having a substantially simple adjustment means for adjusting the distance between the saw blades.

A further object is to provide a tool having a long tubular telescopically-fitted handle for easily adjusting the extension of the tool, thereby to accommodate the cutting of limbs of different heights from the ground.

A further object is to provide a pruning tool having disengageable saw blades, whereby the blades may be readily removed for sharpening.

A further object is to provide an easily operable pruning tool that requires only negligible practice or skill to use effectively.

A further object is to provide a strong and durable tool of substantially simple construction and a tool economical to manufacture and market.

A further object is generally to improve the design and construction of tree pruning tools.

The means by which the foregoing and other objects of the present invention are accomplished and the manner of their accomplishment will be readily understood from the following specification upon reference to the accompanying drawings, in which:

FIG. 1 is a side view of the head part of the tool with the handle being fragmentarily shown.

FIG. 2 is an edge view of the tool as shown in FIG. 1.

FIG. 3 is a sectional view taken as on the line III—III of FIG. 1.

FIG. 4 is a transverse sectional view taken as on the line IV—IV of FIG. 2.

FIG. 5 is a view of the handle of the tool as viewed without the head or cutting part being attached thereto.

FIG. 6 is a longitudinal sectional view of a joint of the handle taken as on the line VI—VI of FIG. 5.

FIG. 7 is a transverse sectional view taken as on the line VII—VII of FIG. 6.

Referring now to the drawings in which the various parts are indicated by numerals, the tool of the present invention is indicated generally by numeral 11 and includes principally a head part 13 and a handle part 15.

Head part 13 includes a pair of thin flat elongated saw blades 17 respectively having an arced inner edge 19 and a straight outer edge 21. A U-shaped support member 23 connects blades 17. Support member 23 is preferably formed of rectangular cross-sectioned resilient strap material, as spring steel or the like, and includes an intermediate portion 25 and a pair of leg portions 27. Leg portions 27 extend substantially parallel from intermediate portion 25 and are U-bent or otherwise formed to provide a channel 29 extending longitudinally in the respective leg portions, as best seen in FIG. 4. For purposes of description, tool 11 will be considered as having a forward end and a rearward end, with the forward end being disposed upwardly, as viewed in the drawings, and that end extending away from handle part 13.

The pair of saw blades 17 are secured respectively to the pair of leg portions 27 of U-shaped support member 23. The straight outer edges 21 respectively of saw blades 17 are respectively received in channels 29 of leg portions 27. Threaded fasteners 31, extending respectively through apertures provided in leg portions 27 and saw blades 17, securely attach the respective saw blades to support member 23. Threaded fasteners 31 are preferably of the carriage-bolt wing-nut combination for the easy removal of pair of blades 17 from support member 23. The arced inner edges 19 of saw blades 17 are provided with saw teeth 33. Teeth 33 are uniform in length and extend from the forward portion of each saw blade 17 to that portion of inner edge 19 adjacent leg portion 27. Teeth 33 are formed so that the pointed ends thereof extend rearwardly, as best seen in FIG. 1. The arced inner edge 19 of each saw blade 17 preferably includes a portion 35 at the forward end thereof which is smooth and without teeth. The smooth edge portions 35 provide means whereby the tool 11 may be readily engaged with a limb during the initial limb cutting actions. U-shaped support member 23, being resilient, has a tendency to urge saw blades 17 together, as shown in FIG. 1.

Handle part 15 preferably comprises a plurality of telescopically-fitted tubular handle sections 37 and joint means for removably and adjustably securing sections 37 together. Each handle section 37 includes an open end portion 39 and a closed end portion 41. In joining two handle sections 37, the closed end section 41 of one section is slidably fitted into the open end portion 39 of the other section. The respective sections 37 are securely positioned at a desired location by turning the respective handle sections in opposite directions. The structural means whereby such a function is accomplished is as follows: The closed end portion 41 of each handle section 37 is provided with an eccentric wheel or cam 43. A cylindrical member 45 is securely fitted in the closed end portion 41 and is fixedly secured thereto by a rivet 47. Eccentric wheel 43 is turnably journaled to cylindrical member 45 at the longitudinal axis thereof by an axle screw 49. Eccentric wheel 43 is freely turnable on axle screw 49. When joining two handle sections 37, the closed end portion 41 of one section is inserted into the open end portion 39 of another section, and the two sections are held substantially horizontal to allow eccentric wheel 43 to engage the inner wall of end portion 41. With the sections 37 held horizontally, they are turned torsionally in opposite directions to cause the eccentric wheel 43 to be turnably urged against the inner wall of end portion 39 and to secure the sections together.

The upper handle section 37 includes an end portion 51 provided with means for attaching handle part 15 to head part 13. End portion 51 is securely attached to intermediate portion 25 of U-shaped support member 23. The means securing handle part 15 and head part 13 preferably is as follows: An aperture 53 is provided in the center of intermediate portion 25 of support member 23. A nut-like block 55, having a threaded aperture, is securely attached, as by welding, to the forward or inward side of intermediate portion 25. A curved backing member 59, having a centrally disposed aperture 61 and a radius less than the radius of support member 23, is provided. A threaded stud 63 is axially secured in end portion 51 of upper handle section 37. Head part 13 and handle part 15 are joined with threaded stud 63 extending through the aperture in backing member 59 and threadedly engaging the threaded aperture of support member 23, as best seen in FIG. 1. A lock nut 67, abuttingly engaging block 55, locks the head part 13 and handle part 15 together.

The relative position of one saw blade 17 to the other saw blade 17 or the distance between the arced and saw-toothed inner edges 19 of the respective blades may be determined or adjusted by turnably positioning handle part 15 relative to head part 13. Thus, if it is desired to close the blades 17 together or to shorten the distance between the blades, the operator has only to loosen lock nut 67, turn handle part 15 inwardly a desired amount, and retighten lock nut 67.

From the foregoing, it is thought that the use of the tool 11 has become apparent, but for a complete disclosure, further use of the tool will be recited briefly. In using tool 11, handle part 15 is adjusted to an extension or length commensuate with the height of the limb to be pruned. The operator then grasps the handle and moves the head part of the tool upwardly and places the pair of blades astraddle the limb to be cut. Moving the tool back and forth simultaneously cuts grooves in opposite sides of the limb and severs the limb from the tree. The limb, as it is cut, may be urged into the hollow of U-shaped support member 23 and the tool used to guide and support the limb as it is lowered to the ground.

The device of the present invention provides means for cutting opposite sides of a limb simultaneously, and match-saws the lamb in such a way as to prevent unwanted splitting or stripping of the wood or bark of the tree. The spring-urged clamping of the limb by the pair of saw blades automatically provides for feed of the blades as the limb is cut. The arced shape of the cutting teeth of the pair of blades provides opposing rocking action to the wood as the limb is cut, and this rocking action aids the teeth in getting a bite in the wood, particularly if the limb is dry or hard. The tool is easily used and is strong and durable. In summary, the present invention provides a very practical tool for trimming or pruning tree limbs.

Although the invention has been described and illustrated with respect to a preferred embodiment thereof, it is to be understood that it is not to be so limited since changes and modifications may be made therein which are within the full intended scope of this invention as hereinafter claimed.

I claim:

A tool for pruning tree limbs comprising a pair of thin flat elongated saw blades with each blade having respectively a forward end and a rearward end and with each blade having respectively an arced and saw-toothed inner edge and a substantially straight outer edge, the teeth respectively of said pair of blades extending toward said rearward end of each blade of said pair of blades, a U-shaped resilient support member having an intermediate portion and a pair of leg portions, said pair of leg portions providing channels respectively in each leg portion, means removably securing said pair of blades respectively to said pair of leg portions of said support member with said outer edges of said pair of blades respectively being received in said channels of said pair of leg portions, said pair of blades being arranged substantially in a common plane and in symmetrical and opposing relationship with each blade being secured to said support member, said arced and saw-toothed edges of said pair of blades being arranged with said saw-toothed edge of one blade being disposed towards said saw-toothed edge of the other blade, said pair of blades being resiliently urged by said support member to closed and at rest positions with said arced and saw-toothed edges respectively being contiguously arranged, and an adjustable elongated handle secured at one end thereof to said intermediate portion of said support member, said handle being securely adjustable to various lengths, said tool being adapted to be used by placing said pair of blades astraddle a tree limb with said arced and saw-toothed edges respectively engaging opposite sides of the limb and reciprocatingly moving said tool to simultaneously cut grooves in opposite sides of the limb and to sever the limb from the tree, said means securing an end of said handle to said intermediate portion of said support member including a threaded aperture means in said intermediate portion, a curved rigid backing member having an aperture therein and a curvature of a radius less than the radius of said support member, and a threaded stud fixedly secured in said end of said handle, said handle being secured to said support member with said threaded stud extending through said backing member and threadedly engaging said threaded aperture means of said intermediate portion, said means securing said handle to said support member being threadedly adjustable to determine the position of one blade relative to the other blade or the distance between said arced and saw-toothed inner edges of said pair of blades.

References Cited by the Examiner

UNITED STATES PATENTS

| 1,224,194 | 5/1917 | Miller | 30—166 |
| 2,526,415 | 10/1950 | Refsdal | 287—58 |
| 2,748,476 | 6/1956 | Cooper | 30—167 |

FOREIGN PATENTS

| 82,861 | 2/1921 | Austria. |

OTHER REFERENCES

German application 1,043,702, Graf, November 1958.

WILLIAM FELDMAN, *Primary Examiner.*

R. V. PARKER, *Assistant Examiner.*